United States Patent
Schippers

(10) Patent No.: US 8,297,857 B2
(45) Date of Patent: Oct. 30, 2012

(54) THEFT DETERRING ADJUSTABLE, TRANSPORTABLE, OUTDOOR CAMERA SUPPORT ASSEMBLY

(76) Inventor: Brad Schippers, Pella, IA (US)

( * ) Notice: Subject to any disclaimer, the term of this patent is extended or adjusted under 35 U.S.C. 154(b) by 175 days.

(21) Appl. No.: 12/851,720

(22) Filed: Aug. 6, 2010

(65) Prior Publication Data

US 2011/0222842 A1 Sep. 15, 2011

Related U.S. Application Data

(60) Provisional application No. 61/231,914, filed on Aug. 6, 2009.

(51) Int. Cl.
*G03B 17/00* (2006.01)
*E05B 73/00* (2006.01)

(52) U.S. Cl. .......................................... 396/428; 70/58

(58) Field of Classification Search ................... 396/428, 396/419–427; 70/58
See application file for complete search history.

(56) References Cited

U.S. PATENT DOCUMENTS

2005/0051683 A1* 3/2005 Young ........................ 248/187.1
* cited by examiner

*Primary Examiner* — Rochelle-Ann J Blackman
(74) *Attorney, Agent, or Firm* — Boardman & Clark LLP

(57) ABSTRACT

An adjustable locking camera support assembly is provided. The assembly includes a camera support assembly and a ground engaging assembly. The camera support assembly includes a first support in telescopic communication with a second support, a camera mount pivotally connected to the first support, and a support plate connected to the second support, the support plate includes a first aperture forming a passage to a hollow portion of the second support, and a second aperture. The ground engaging assembly includes a retention plate having a first side opposing a second side, an orifice carried by the retention plate, a first member connected to the first side of the retention plate, the first member being removably received by the first aperture and hollow portion of the second support of the camera support assembly, and a second member connected to the second side of the retention plate, the second member carrying an auger. An anchor member is removably received by the retention plate orifice and adapted to removably engage a passage carried by the first member. A locking mount is carried by the retention plate, the locking mount being removably received by the second aperture of the support plate of the camera support assembly.

18 Claims, 7 Drawing Sheets

THEFT DETERRING ADJUSTABLE, TRANSPORTABLE, OUTDOOR CAMERA SUPPORT ASSEMBLY

CROSS-REFERENCE TO RELATED APPLICATIONS

This application claims priority from U.S. Provisional Application Ser. No. 61/231,914, filed Aug. 6, 2009, entitled THEFT DETERRING ADJUSTABLE, TRANSPORTABLE, OUTDOOR CAMERA SUPPORT ASSEMBLY AND METHOD OF USE, the contents of which is hereby incorporated in its entirety by reference.

FIELD OF THE INVENTION

The present invention relates to an outdoor camera support assembly. The present invention more specifically relates to an adjustable, transportable, outdoor camera support assembly having a theft deterring assembly.

BACKGROUND

Cameras and specifically cameras designed for remote use in the outdoors are growing in popularity and use. These outdoor cameras may be used to monitor and track animals, people or conduct surveillance. Further, outdoor cameras may be used by a wide range of individuals, including, but not limited to, hunters, scientists, researchers, security, police, military and wildlife enthusiasts desiring to photograph or monitor people, property or wildlife. Such cameras are often programmed to operate based upon predetermined criteria and positioned by a user in a predetermined place outdoors. Once positioned, the user generally leaves for a period of time and the camera will photograph or film anything which may trigger the camera.

Outdoor cameras may include a traditional analog or film camera for taking still photos, an analog or tape video camera, a closed-circuit television camera or a digital camera able to take digital still photos and/or digital movies. The cameras are often enclosed in a weatherproof housing or shell to shield the camera from damaging weather conditions. The housing may also assist in camouflaging or hiding the camera from plain view. Some outdoor cameras are detachable from the weatherproof shell for traditional manual operation by a user. Further, some shells may be adapted to receive standard cameras, eliminating the need to purchase an additional camera or specialized outdoor camera.

In addition to housing a camera, the weatherproof shell may also house additional components operably connected to the camera to assist in acquiring quality film, photographs or pictures. For example, the shell may include a motion detection assembly. Motion detection assemblies may range from optical or acoustical motion sensors to passive infrared heat-and-motion detection which may automatically adjust to the time of day and ambient temperature to avoid false signals. Once the detection assembly is triggered, the outdoor camera will take a still photograph or movie. The housing may also include additional components, for example, but not limited to, an adjustable timer or delay allowing a user to adjust the time delay between photos from a matter of seconds (for trails) to every hour (for large spaces or food plots), a laser aiming device to assist in positioning and aiming the camera, a flash for photos in low light or night conditions to account for nocturnal movement, and/or a wide angle lens for photographing animals in close proximity to the camera and camera shell. The camera may also include additional features, including, but not limited to, time and date stamping of photos or film to allow a user to identify animals and chart movement patterns and/or selective operation based upon time of day.

Outdoor cameras, alone, come in a variety of price points, depending upon the desired set of features. For example, an outdoor camera can cost as little as $50.00, but can cost up to and exceed $500.00. The cost increases based upon the number and type of components and/or features associated with the camera. The cost of an outdoor camera, combined with the unobserved and/or remote positioning can present a significant risk of theft. Unfortunately, devices available for deterring the theft of outdoor cameras are limited. This forces a user to balance the freedom of placement of the outdoor camera with the risk of loss or theft.

One option available to a user is to mount or position the outdoor camera on a tripod. This provides a user a great amount of flexibility as the tripod can be positioned on a variety of terrains, for example, rocky or mountainous, in a forest, or in an open field. Further, the tripod is free to be moved to another location with minimal effort. In addition, the outdoor camera can be positioned inside or behind bushes or brush to assist in camouflaging the assembly. However, the tripod carries a great risk of theft. While the camera may be locked or secured to the tripod, the tripod is not locked or secured to an object. Accordingly, a thief may take the entire tripod and camera.

Another option for camera placement is a portable stand which may be placed in the ground. While this type of stand may allow for a variety of placement positions, the stand is limited to certain terrains, specifically those with a ground which may receive the stand. Further, similar to the tripod, while the camera may be locked to the stand, the stand is not locked or secured to an object. A thief may simply take the entire stand and camera.

To deter potential theft when using a tripod or a portable stand, a user must secure the tripod or stand to an object which is not easily moveable or anchored, for example a tree, post or building. While securement may deter theft, it limits the positioning options available to areas in close proximity to the anchored object. Further, depending on the size of the anchored object, for example a large diameter tree, the tripod or portable stand may not be easily secured.

Currently, the only other theft deterring option available to a user is to position the outdoor camera on a permanent or anchored object. For example, the outdoor camera may be attached to or positioned on a tree, fence post, building or a post driven into the ground by a user. Devices are available to lock the outdoor camera to these anchored objects. However, again the user is limited to placement of the outdoor camera to only areas with an anchored object. For example, fields or non-wooded areas may not have natural, anchored objects, like a tree. In these environments, a user is required to install an anchored object, like a post. This may limit the flexibility of camera placement, as the user must anchor a post in each potential camera position. Further, once attached to the anchored object, the outdoor camera is limited in its ability to be positioned to photograph or film different views. Once attached or locked to the object, the outdoor camera cannot be moved up or down and is not free to rotate about the object.

Accordingly, it would be desirable to provide a support device allowing an outdoor camera user the freedom of camera placement in a variety of locations and environments, ease in moving and repositioning the support device, flexibility in positioning the outdoor camera for photographing different views once the support device is positioned, providing an assembly for deterring the theft of the outdoor camera and camera support device, and providing a device which may support outdoor cameras sold by different companies having different models, sizes arrangements and attachment devices.

SUMMARY OF THE INVENTION

An adjustable locking camera support assembly is provided. The assembly includes a camera support assembly and a ground engaging assembly. The camera support assembly includes a first support in telescopic communication with a second support, a camera mount pivotally connected to the first support, and a support plate connected to the second support, the support plate includes a first aperture forming a passage to a hollow portion of the second support, and a second aperture. The ground engaging assembly includes a retention plate having a first side opposing a second side, an orifice carried by the retention plate, a first member connected to the first side of the retention plate, the first member being removably received by the first aperture and hollow portion of the second support of the camera support assembly, and a second member connected to the second side of the retention plate, the second member carrying an auger. An anchor member is removably received by the retention plate orifice and adapted to removably engage a passage carried by the first member. A locking mount is carried by the retention plate, the locking mount being removably received by the second aperture of the support plate of the camera support assembly.

In another embodiment of an adjustable locking camera support assembly, the assembly includes a support assembly having a first end and a second end, a camera support in communication with the support assembly and a first plate connected to the second end of the support assembly, the first plate carrying a first aperture through the first plate and into the interior of the support assembly, and a second aperture. A ground engaging assembly includes a second plate, a first member connected to a first side of the second plate, the first member removably received by the first aperture of the first plate and the interior of the support assembly, and a second member connected to a second side of the second plate, the second member carrying a screw auger. A locking mount is carried by the second plate and removably received by the second aperture.

A method of engaging an adjustable locking camera support assembly is also provided. The method includes placing a ground engaging assembly at a position in the ground, applying rotational force on the ground engaging assembly to drive an auger into the ground, engaging an anchor member with the ground engaging assembly and the ground, engaging an adjustable camera support assembly with the ground engaging assembly, locking the adjustable camera support assembly to the ground engaging assembly, attaching an outdoor camera to the adjustable camera support assembly, and locking the outdoor camera to the adjustable camera support assembly.

DETAILED DESCRIPTION

The following presents one or more examples of embodiments of an adjustable, transportable, outdoor camera support assembly 100 having a theft deterring locking assembly 200.

Figure 1:
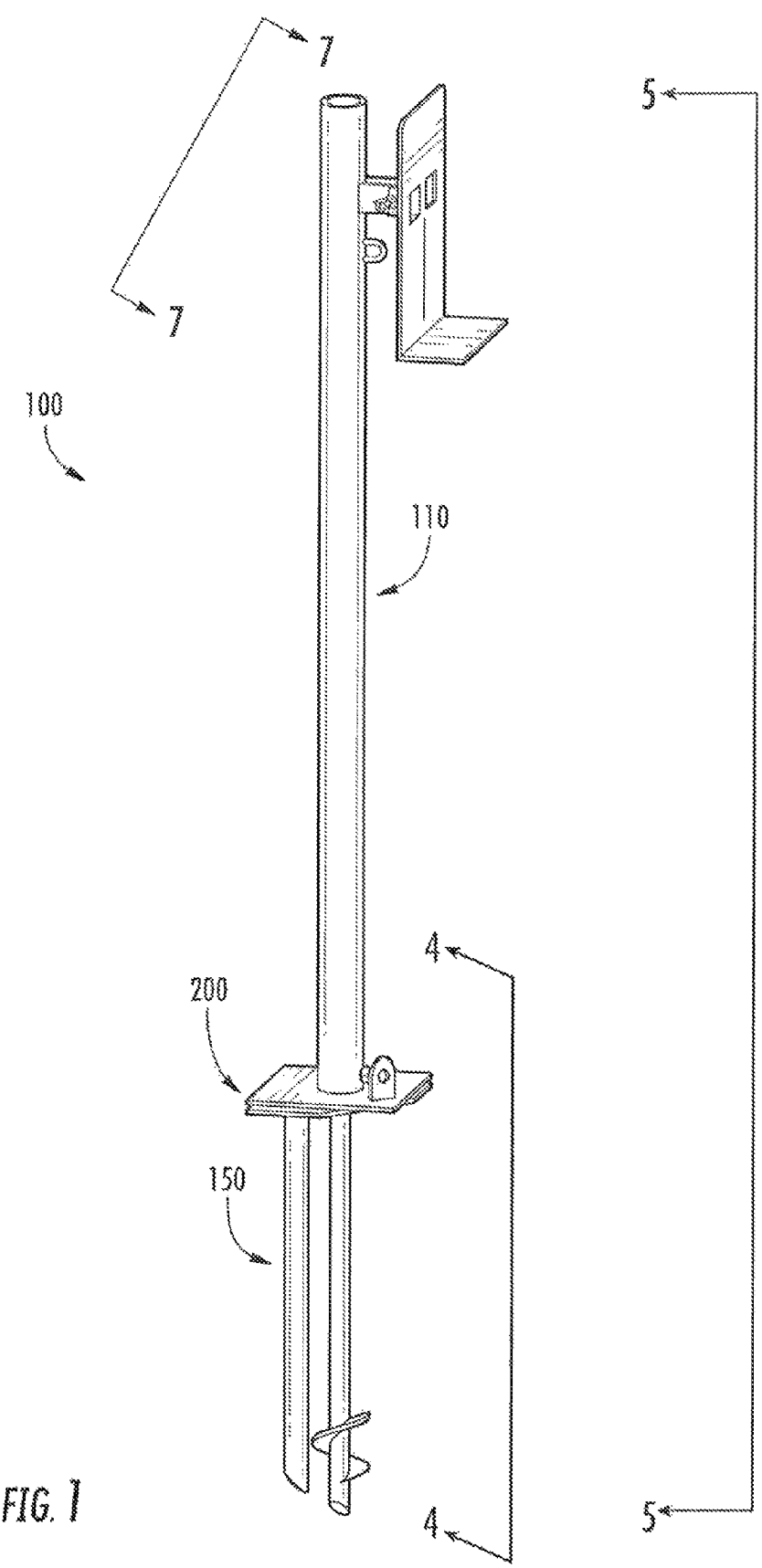
FIG. 1 is an isometric view according to one or more examples of embodiments of an adjustable locking camera support assembly, showing the camera support assembly operably engaging the ground engaging assembly.
Figure 4:
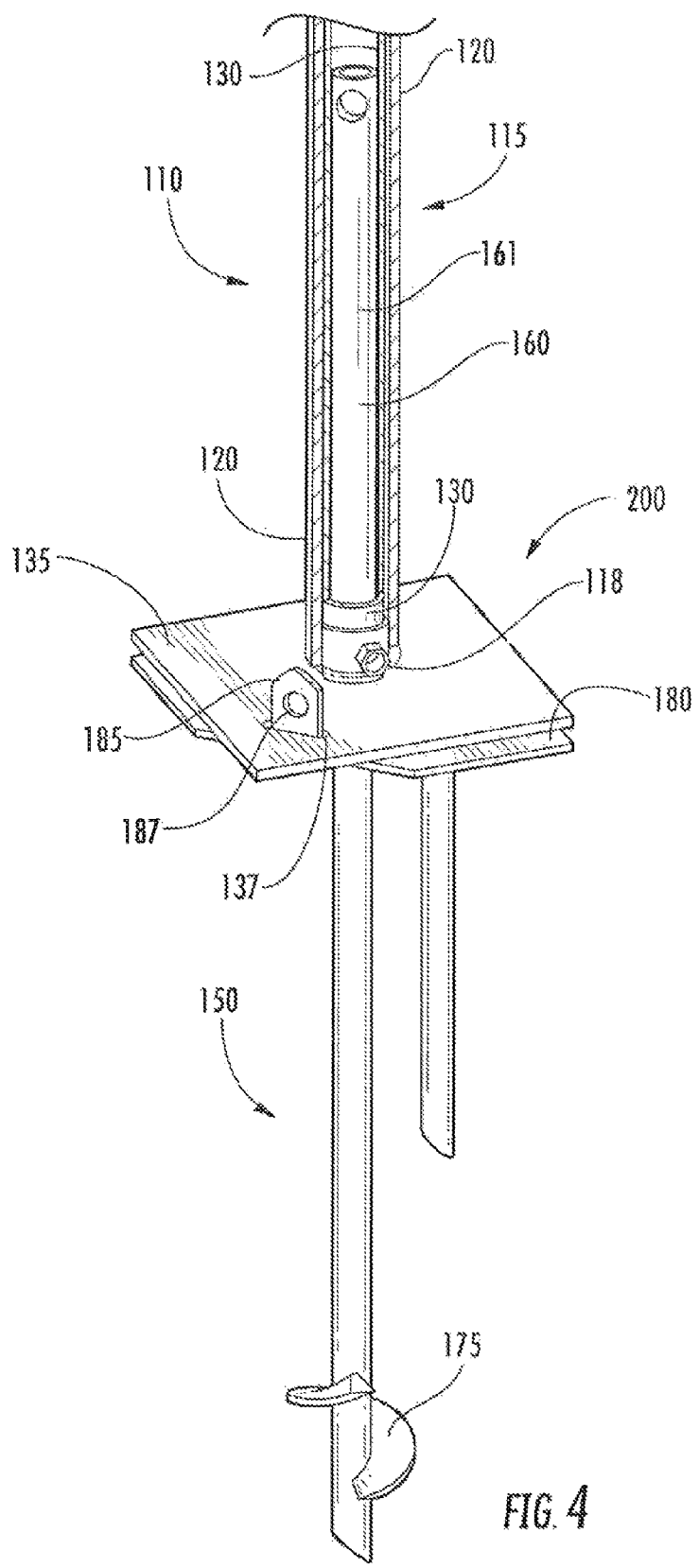
FIG. 4 is a sectional isometric view of the adjustable locking camera support assembly of FIG. 1, having portions of the telescoping assembly removed to show the camera support assembly operably engaging the ground engaging assembly taken along line 4-4 of FIG. 1.

Referring to the Figures, an adjustable locking camera support assembly 100 is provided. As illustrated in FIG. 1, the adjustable locking camera support assembly 100 includes an adjustable camera support assembly 110 and a ground engaging assembly 150. As shown in FIGS. 1 and 4, the adjustable camera support assembly 110 and ground engaging assembly 150 operably engage or connect to form a locking assembly 200.

Figure 2:
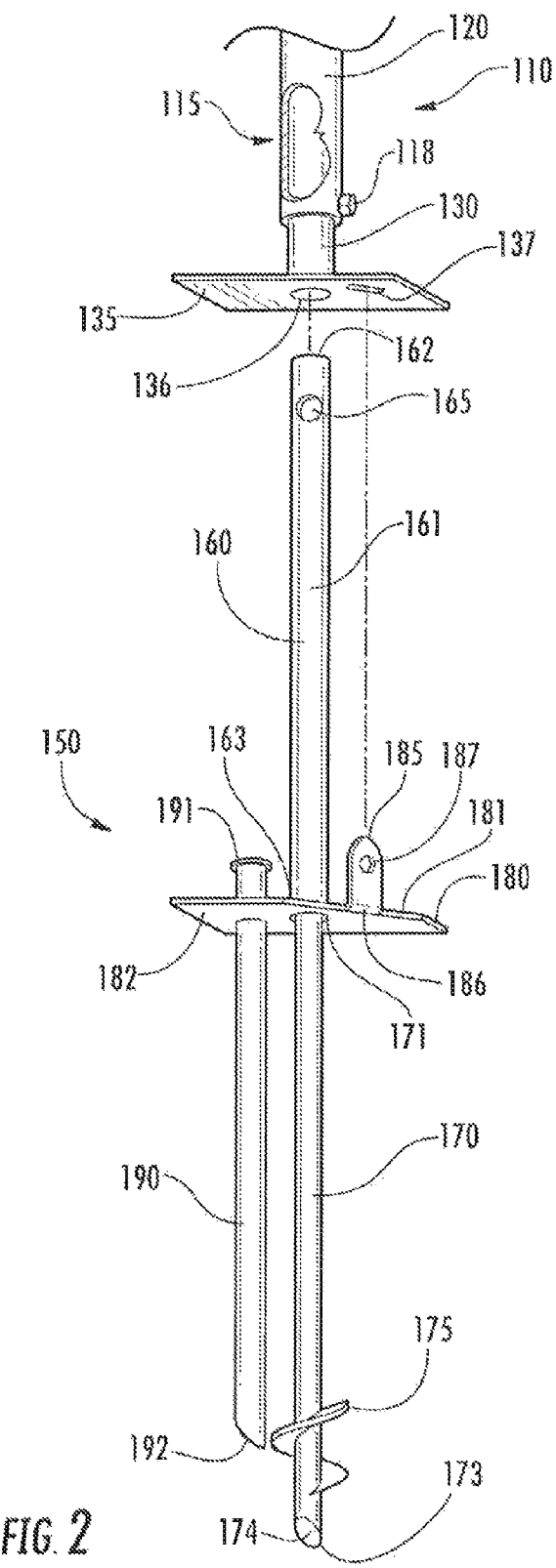
FIG. 2 is a sectional isometric view of the adjustable locking camera support assembly of FIG. 1, showing the ground engaging assembly disengaging from the camera support assembly and a partial cutaway of the telescoping support assembly.

As illustrated in FIG. 2, the ground engaging assembly 150 may include a support assembly engagement portion 160, a ground engagement portion 170, a retention plate 180 and an anchor portion or anchor member 190. The ground engaging assembly 150 may be formed of steel. However, in one or more examples of embodiments, the ground engaging assembly 150 may be formed of iron, polyvinyl chloride, composite plastic, hardened vinyl, recycled plastic, fiber board, or any other metal, alloy, natural or synthetic material. Preferably, such material would have sufficient strength to support an outdoor camera, endure a variety of adverse weather conditions and provide deterrence against theft. The support assembly engagement portion 160, ground engagement portion 170 and retention plate 180 may be interconnected or joined by welding. However, in one or more examples of embodiments, the support assembly engagement portion 160, ground engagement portion 170 and retention plate 180 may be formed of a unitary body, for example cast as a single assembly, or may be interconnected or joined by adhesive, bolting, or any other known or to be developed attachment method with sufficient strength to provide the necessary structural rigidity. The support assembly engagement portion 160 and ground engagement portion 170 are generally aligned end to end. However, in one or more examples of embodiments, the support assembly engagement portion 160 and ground engagement portion 170 are offset from one another.

Figure 3:
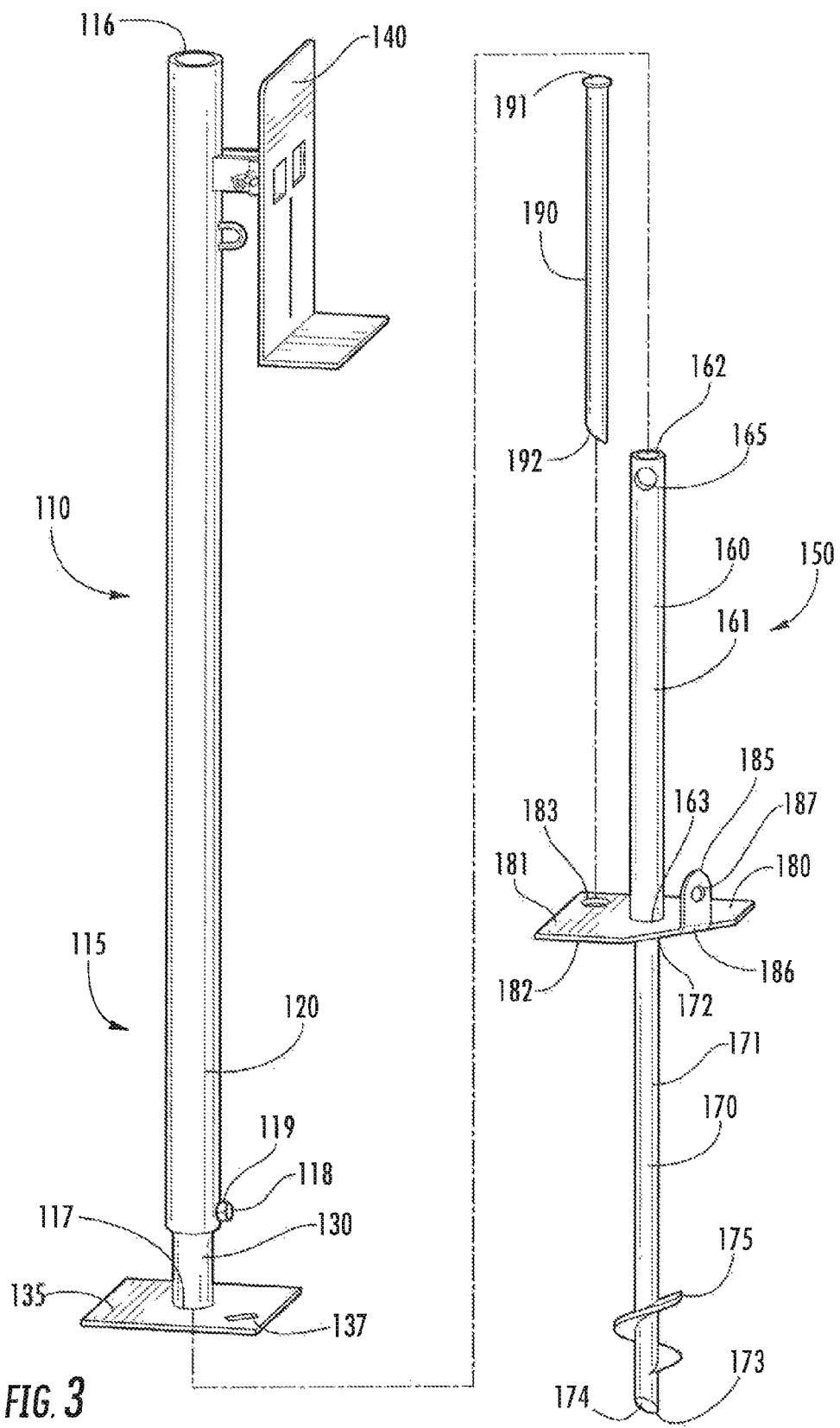
FIG. 3 is an exploded view of the adjustable locking camera support assembly of FIG. 1.
Figure 6:
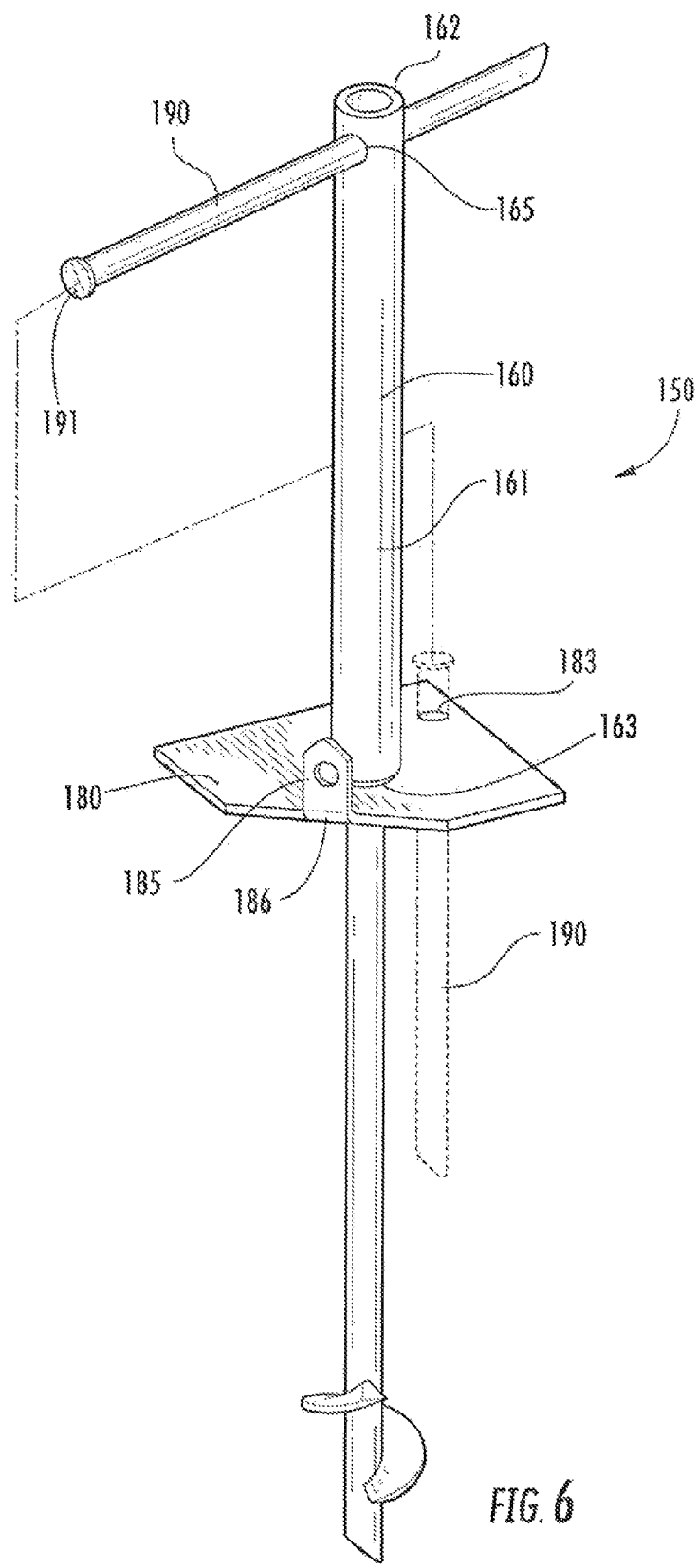
FIG. 6 is an isometric view of the ground engaging assembly of FIG. 1, illustrating the retention plate removably receiving the anchor member in broken lines and the support assembly engagement portion removably receiving the anchor member in solid lines.

Referring to FIGS. 2 and 3, the support assembly engagement portion 160 may include a first member or bar or first element 161. The first member 161 may be cylindrical and may be formed of steel ranging in size from 11 gauge to 16 gauge. The first member 161 may have a first end 162 and a second end 163. In operation, the first member 161 may be arranged approximately perpendicular to the ground with the first end 162 positioned further away from the ground than the second end 163. Positioned toward the first end 162 of the first member 161 may be an aperture or passage or conduit 165. The aperture 165 may further include or form a cylindrical channel passing entirely through the first member 161. The aperture 165 may have a diameter which closely approximates or is larger than the diameter of the anchor member 190 allowing the aperture 165 to removably receive the anchor member 190 (as illustrated in FIG. 6). Further, the aperture 165 may have a diameter smaller than the diameter of the head 191 of the anchor member 190 to prevent the anchor member 190 from passing entirely through the aperture 165. In one or more examples of embodiments, the first member 161 may be hollow or solid. Further, the first member 161 may be formed of steel or steel pipe having a variety of wall thicknesses or inside diameters or schedules ranging from 40 to 160. In one or more examples of embodiments, the first member 161 may be polygonal and may have an outer diameter which closely approximates or is smaller than the inner diameter of the inner support 130 of the telescoping support assembly 115. In one or more examples of embodiments, the aperture 165 may have a polygonal channel adapted to receive a matching polygonal anchor portion, for example, but not limited to, a triangle, a square, a pentagon, a hexagon, or an octagon.

Positioned below the support assembly engagement portion 160 may be a ground engagement portion 170. As shown in FIGS. 2 and 3, the ground engagement portion 170 may include a second member or second element 171. The second member 171 may include a first end 172 and a second end 173. At the second end 173, the second member 171 may include a slanted portion or slanted end or sloped portion 174. The slanted portion 174 may be shaped in a variety of different angles to the second member 171 to assist in engagement of the second member 171 with the ground. In addition, the second member 171 may carry or have attached or connected an auger or screw auger or helical flights or flighted portion 175. The auger 175 may be used to drill into the ground or soil to secure the ground engaging assembly 150. As illustrated in FIGS. 2 and 3, the auger 175 is arranged toward the second end 173 of the second member 175. In one or more examples of embodiments, the auger 175 may have a varying amount of flighting or be positioned at different locations along the second member 175 to assist drilling in different soil compositions or conditions. Further, in one or more examples of embodiments, the second member 171 may be a spike, screw, stake or other boring or attachment device sufficient to engage the ground engagement portion 170 with the ground. In one or more examples of embodiments, the second member 171 may be of varying lengths to provide stability based upon different soil compositions.

Positioned between the support assembly engagement portion 160 and ground engagement portion 170 may be retention plate or second plate 180. As illustrated in FIGS. 2 and 3, the retention plate 180 may include a first side 181 opposite a second side 182. In operation, the retention plate 180 may be arranged approximately parallel to the ground with the first side 181 positioned further away from the ground than the second side 182. The first side 181 of the retention plate 180 may be attached to or in communication with the second end 163 of the first member 161 of the support assembly engagement portion 160. The second side 182 of the retention plate 180 may be attached to or in communication with the first end 172 of the second member 171 of the ground engagement portion 170. To this end, the retention plate 180 may be arranged approximately orthogonal or perpendicular to the first member 161 and second member 171. In one or more examples of embodiments, the retention plate 180 may be formed of different sizes, including a variety of lengths, widths and heights. Further, in one or more examples of embodiments, the retention plate 180 may be circular, polygonal, or any other geometric or irregular shape.

Referring to FIGS. 2-4, the retention plate 180 may carry a locking mount 185. The locking mount 185 may be integrally formed or attached to the retention plate 180, for example by weld, solder, adhesive, or any other suitable method of attachment with sufficient strength to resist damage while in engagement with the adjustable camera support assembly 110. The locking mount 185 may be arranged to extend in a plane generally perpendicular to the retention plate 180. Further, the locking mount 185 may extend toward the support assembly engagement portion 160 side of retention plate 180. In one or more examples of embodiments, the locking mount 185 may be arranged in an acute or obtuse angle in relation to the retention plate 180. Further, in one or more examples of embodiments, the locking mount 185 may be formed of any suitable geometry to assist in engagement with the adjustable camera support assembly 110. In one or more examples of embodiments, the locking mount 185 may be a variety of lengths or thicknesses suitable for providing structural rigidity and resistance to damage while in engagement with the adjustable camera support assembly 110.

As shown in FIGS. 2, 3 and 6, the locking mount 185 may be offset from the retention plate 180 by an angled portion 186. The angled portion 186 may generally be arranged at a forty-five degree angle to the retention plate 180. However, in one or move examples of embodiments, the angled portion 186 may be arranged at different angles to the retention plate 180 and may extend any distance between the retention plate 180 and the locking mount 185.

As illustrated in FIGS. 2 through 4, the locking mount 185 may include a locking opening 187. The locking opening 187 may be an aperture or port or passage extending through the locking mount 185. The locking opening 187 may be circular or cylindrical to assist in receiving a locking device, for example, but not limited to, the shackle of a padlock or combination lock. Alternatively, in one or more examples of embodiments, the locking opening 187 may be polygonal to receive a matching polygonal locking device. Further, in one or more examples of embodiments, the locking opening 187 may have different sizes and/or diameters to receive different size locking devices.

As illustrated in FIGS. 3 and 6, the retention plate 180 may carry an orifice 183. The orifice 183 may be an aperture or opening passing entirely through the retention plate 180 and may be sized to receive or mate with the anchor member 190. Specifically, the orifice 183 may have a diameter which closely approximates or is larger than the diameter of the anchor member 190. Further, the diameter of the orifice 183 may be smaller than the diameter of the head 191 of the anchor member 190.

Referring to FIGS. 2 and 3, the anchor member 190 may include a head 191 and a sloped or pointed end 192 opposite the head 191. The head 191 may have a diameter greater than the diameter of the anchor member 190. The sloped end 192 may form a variety of angles in relation to the anchor member 190 to assist in engagement with the ground. Further, the retention plate 180 may removably receive the anchor member 190 by engagement with the orifice 183. In one or more examples of embodiments, the anchor member 190 may be of different lengths or diameters to confront different soil compositions or conditions and assist in anchoring the ground engagement assembly 150 in the ground.

Figure 5:
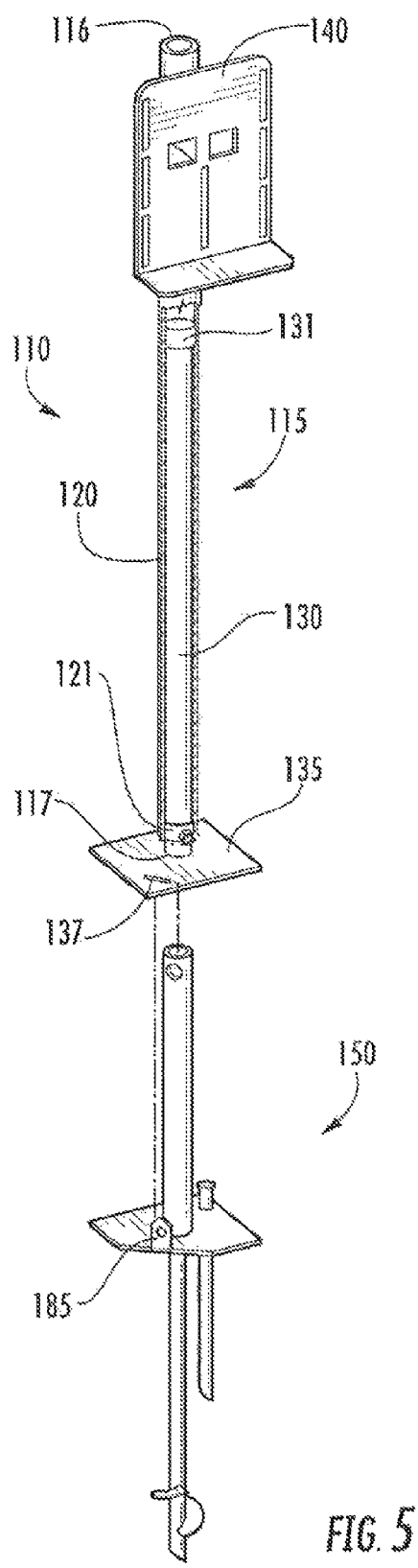
FIG. 5 is a sectional isometric view of the adjustable locking camera support assembly of FIG. 1, having portions removed to illustrate the telescoping assembly of the camera support assembly taken along line 5-5 of FIG. 1.

Operably connected to the ground engaging assembly 150 may be the adjustable camera support assembly 110. As shown in FIGS. 3 and 5, the adjustable camera support assembly 110 may include a telescoping support assembly 115, a support plate 135 and a camera support or universal camera mount 140. The adjustable camera support assembly 110 may be formed of steel. However, in one or more examples of embodiments, the adjustable camera support assembly 110 may be formed of iron, polyvinyl chloride, composite plastic, hardened vinyl, recycled plastic, fiber board, or any other metal, alloy, natural or synthetic material.

As illustrated in FIG. 5, the telescoping assembly 115 may include a first end 116, a second end 117, an outer support 120, and an inner support 130. The outer support or first support 120 and inner support or second support 130 may each be formed of hollow steel pipe, each support 120, 130 having a different gauge or diameter. As shown in the illustrated embodiment, the outer support 120 may have an inner diameter which closely approximates or is larger than the outer diameter of the inner support 130. This enables the inner support 130 to be removably received by the outer support 120, allowing for telescopic adjustment of the telescoping assembly. In one or more examples of embodiments, the outer support 120 and/or inner support 130 may be a partially hollow member or may be a solid member.

The telescoping assembly 115 may include one or more stop collars 121, 131 to limit the telescoping distance of the telescoping assembly 115. As illustrated in FIG. 5, the outer support 120 may have an outer support stop collar 121 and the inner support 130 may have an inner support stop collar 131. The outer support stop collar 121 may be positioned within a portion of the inner diameter of the outer support 120. The inner support stop collar 131 may be positioned around a portion of the circumference of the outer surface of the inner support 130. The inner diameter of the outer support stop collar 121 closely approximates or is larger than the outer diameter of the inner support 130, allowing for telescopic movement of the outer support 120 about the inner support 130. Further, the inner diameter of the outer support stop collar 121 is smaller than the outer diameter of the inner support stop collar 131. Thus, the outer support 120 may be telescopically adjusted in relation to the inner support 130 until the inner support stop collar 131 contacts the outer support stop collar 121. The stop collars 121, 131 act to restrict or limit further telescopic movement of the telescoping assembly 115.

As shown in FIGS. 2-4, the telescoping assembly 115 may include a tightening member 118. The tightening member 118 may allow a user to telescopically adjust the telescoping assembly 115 or rotate the outer support 120 about the inner support 130 (or the inner support 130 about the outer support 120), and then adjust the tightening member 118 to hold the telescoping assembly 115 in place. As illustrated, the outer support 120 may carry the tightening member 118. The tightening member 118 may include a threaded member (not shown) removably received by a corresponding threaded hole (not shown) positioned in the outer support 120. Referring specifically to FIG. 3, the tightening member 118 may have a user actuation assembly or handle 119. This may allow a user to adjust and tighten the tightening member 118, for example in relation to the threaded hole (not shown), wherein the tightening member 118 moves toward the inner support 130. The tightening member 118 may contact the inner support 130, applying a force toward the inner support 130 and holding the outer support 120 in place in relation to the inner support 130. In one or more example of embodiments, the tightening member 118 may include any assembly suitable for adjustably fastening the outer support 120 in relation to the inner support 130.

Referring to FIGS. 3 and 5, the second end 117 of the telescoping assembly 115 may be in communication with the support plate or first plate 135. As illustrated, the support plate 135 is connected to the telescoping assembly 115, and specifically the inner support 130, by weld. In one or more examples of embodiments, the support plate 135 may be connected to the telescoping assembly 115 by adhesive, may be integrally formed, or may be attached by any method with sufficient strength to support an outdoor camera and provide deterrence against theft. In one or more examples of embodiments, the telescoping assembly 115 and the support plate 135 may be formed of a unitary body, for example cast as a single assembly, or may be interconnected or joined by adhesive, bolting, or any other known or to be developed attachment method with sufficient strength to provide the necessary structural rigidity. Further, in one or more examples of embodiments, the support plate 135 may be formed of different sizes, including a variety of lengths, widths and heights. In one or more examples of embodiments, the support plate 135 may be circular, polygonal, or any other geometric or irregular shape. In one or more examples of embodiments, the telescoping assembly 115 may carry a cap (not shown) at the first end 116 to avoid collection of dirt, precipitation or other debris in the telescoping assembly 115.

Referring now to FIG. 2, the support plate 135 may include an engagement aperture 136. The engagement aperture 136 creates a passage or channel through the support plate 135 and into the inner support 130, providing access to the inner diameter of the inner support 130. This allows the adjustable camera support assembly 110, and specifically the inner support 130, to removably receive the ground engaging assembly 150, and specifically the first member 161 of the support assembly engagement portion 160 (as shown in FIG. 4).

As illustrated in FIGS. 2, 3 and 5, the support plate 135 may carry a locking receiving aperture 137. The locking receiving aperture 137 may pass entirely through the support plate 135 to form a passage or opening and may be arranged to operably engage or removably receive the locking mount 185 of the retention plate 180. Accordingly, as illustrated, the locking receiving aperture 137 may be a slot arranged to operably engage or mate with the locking mount 185. In one or more examples of embodiments, the locking receiving aperture 137 may be positioned anywhere on the support plate 135 to operably engage the locking mount 185. Further, the support plate 135 may include a plurality of locking receiving apertures 137. The locking receiving aperture 137 may also be formed of any geometric arrangement suitable for operably engaging a corresponding locking mount 185.

Figure 7:
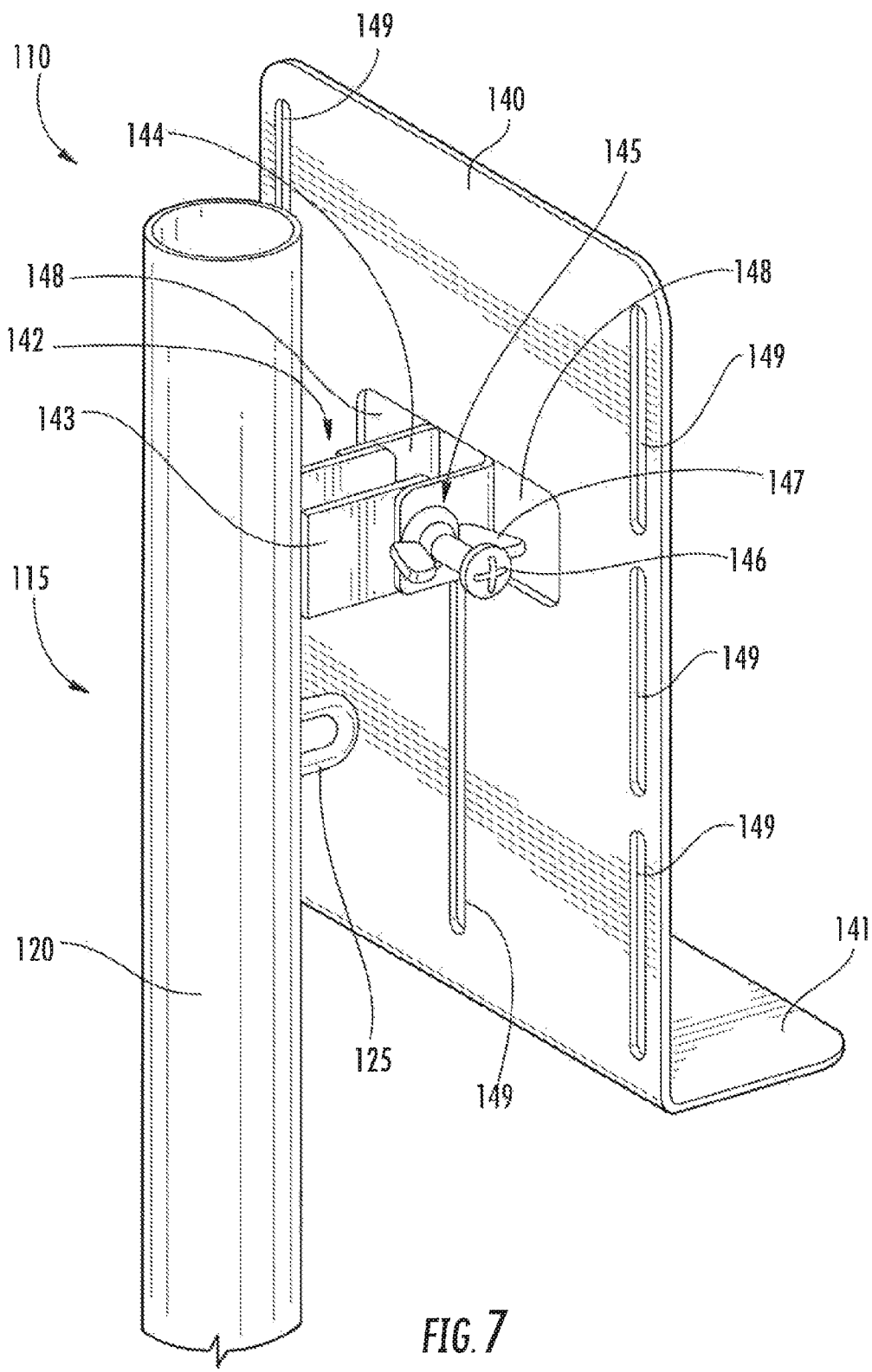
FIG. 7 is an isometric view of the adjustable locking camera support assembly of FIG. 1, taken along line 7-7 of FIG. 1.

Referring to FIG. 7, the telescoping assembly 115 may be adjustably connected to a universal camera mount 140. Specifically, the camera mount 140 may be connected to the outer support 120 of the telescoping assembly 115 by a pivotal connector assembly 142. The pivotal connector assembly 142 may include a first connector assembly 143 attached to the outer support 120 and a second connector assembly 144 attached to the universal camera mount 140. Connecting the first and second connector assemblies 143, 144 may be a tightening member 145, for example a threaded member 146 and a matching threaded nut 147. As illustrated, the tightening member 145 is a combination of a bolt 146 and wing nut 147. The tightening member 145 may be received by a series of apertures (not shown) in the pivotal connector assembly 142. In this arrangement, the tightening member 145 may form a pivot axis, enabling adjustable movement of the universal camera mount 140 about the tightening member 145 and allowing for positioning of the universal camera mount 140 at various angles to the telescoping assembly 115. Once positioned, the tightening member 145 may be tightened, maintaining the position of the universal camera mount 140.

In one or more examples of embodiments, the pivotal connector assembly 142 may be a cam assembly, a quick release skewer and acorn nut assembly similar to a retention device on a bicycle seat, or any other suitable device which may be adjustable and applies force on the universal camera mount 140. Further, in one or more examples of embodiments, a biasing member or spacer (not shown) may be positioned within the first connector assembly 143 to apply a biasing force outward or toward connector assemblies 143, 144. The spacer (not shown) may also removably receive tightening member 145.

The camera mount 140 may include one or more apertures 148 and/or slots 149 for receiving different forms of outdoor camera attachment devices. Outdoor cameras may have different attachment devices, for example, but not limited to, longitudinal straps and/or a pin and nut assembly, such as a centrally positioned pin and nut assembly. A combination of slots 149 and/or apertures 148 positioned both centrally and along the perimeter of the camera mount 140 enables a variety of outdoor cameras using different attachment devices to be connected to the camera mount 140.

The camera mount 140 may also include a support portion 141. The support portion 141 may be integrally formed with the camera mount 140 or attached, for example, by weld. The support portion 141 may assist in supporting an outdoor camera attached or mounted to the camera mount 140. As shown in FIG. 7, the support portion 141 is approximately orthogonal or perpendicular to the camera mount 140. In one or more examples of embodiments, the support portion 141 may be arranged at an acute or obtuse angle to the camera mount 140. Further, in one or more examples of embodiments, the support portion 141 may be arranged or extend at different distances away from the camera mount 140.

The adjustable camera support assembly 110 may also include a camera lock ring 125 to lock an outdoor camera positioned on the camera mount 140 to the telescoping assembly 115. As illustrated in FIG. 7, the camera lock ring 125 may include a ring welded or attached to the outer support 120 of the telescoping assembly 115. An outdoor camera may be locked directly to the camera lock ring 125 or may be locked via an extension, for example by a cable or cable locking device. In one or more examples of embodiments, the outdoor camera may be locked directly to the camera mount 140 or telescoping assembly 115.

Referring next to FIG. 4, the adjustable camera support assembly 110 and ground engaging assembly 150 may operably engage or connect to form a theft deterring locking assembly 200. The locking assembly 200 is formed by the combination of the adjustable camera support assembly 110 removably receiving the support assembly engagement portion 160 and the locking receiving aperture 137 removably receiving the locking mount 185 (as illustrated in FIGS. 2 and 4). Once fully received or engaged, the locking assembly 200 is formed. A user may then engage a locking device, for example, but not limited to, the shackle of a padlock or combination lock, through the locking opening 187 of the locking mount 185. Once engaged, the adjustable camera support assembly 110 and ground engaging assembly 150 cannot be separated without removal of the locking device.

In operation and use, a user may identify an area which is desirous for placement of an outdoor camera, and specifically the adjustable locking camera support assembly 100. The user will place the ground engaging assembly 150 in the desired area of ground. The user will then place the anchor member 190, sloped end 192 first, into the ground engaging assembly aperture 165 (as illustrated in FIG. 6). This arrangement creates a torque arm. The user will then apply rotational force on the anchor member 190, which translates into rotation of the ground engagement portion auger 175. The user may continue to apply rotational force until the ground engagement portion 170 is entirely engaged into the ground, wherein the second side 182 of the retention plate 180 is contacting the ground. The user may then remove the anchor member 190 from the ground engaging assembly aperture 165, align the anchor member 190, sloped end 192 first, with the retention plate orifice 183, and apply downward force on the anchor member 190, driving the anchor member 190, sloped end 192 first, through the orifice 183 and into the ground. The anchor member 190 may be driven into the ground until the head 191 is in communication with the first side 181 of the retention plate 180.

Once the ground engaging assembly 150 is engaged with the ground, the user may align the adjustable camera support assembly 110 to engage with the ground engaging assembly 150. Specifically, the user may align the support plate engagement aperture 136 with the support assembly engagement portion 160, and specifically the first member 161. The first member 161 is inserted into and through the support plate engagement aperture 136 and then removably received by the telescoping assembly 150, and specifically the inner support 130 (see FIGS. 2 and 4). During insertion or engagement, the user aligns the support plate locking receiving aperture 137 with the retention plate locking mount 185. Subsequently, the receiving aperture 137 removably receives the locking mount 185. Once fully engaged, the locking assembly 200 is formed (see FIG. 4). A user may then engage a locking device, for example, but not limited to, the shackle of a padlock or combination lock, through the locking opening 187 of the locking mount 185. Once locked, the adjustable camera support assembly 110 and ground engaging assembly 150 cannot be separated without removal of the locking device.

The user is now free to mount the outdoor camera to the camera mount 140. Depending on the outdoor camera attachment device, the user may employ one or more of the slots 149 and/or apertures 148 to connect the outdoor camera to the camera mount 140. Once connected, the user may lock the outdoor camera to the adjustable camera support assembly 110, either by employing the camera lock ring 125 or locking the camera directly to the telescoping assembly 115 or camera mount 140 using a locking device.

Once mounted, the user may adjust the adjustable camera support assembly 110 to properly position the outdoor camera to take the desired photos or movies. The user may adjust the telescoping assembly 115, and specifically move the outer support 120 in relation to the inner support 130 to increase or decrease the height of the adjustable camera support assembly 110. Further, the user may rotate the outer support 120 about the inner support 130 rotationally adjust the direction adjustable camera support assembly 110. Once positioned at the desired height and/or direction, the user may engage the tightening member 118 to maintain the height and/or direction. The user may also adjust the angle of the camera through adjustment of the pivotal connector assembly 142. Specifically, the user may actuate or adjust the tightening member 145 to loosen the pivotal connector assembly 142. Once loosened, the camera mount 140 may be pivoted about the tightening member 145 to the desired angle. The user may then tighten the tightening member 145 to maintain the desired angle.

Once fully engaged, the adjustable locking camera support assembly 100 provides deterrence against theft. The outdoor camera is locked to the adjustable locking camera support assembly 110. In addition, the locking assembly 200 deters theft, as a potential thief cannot easily remove the ground engaging assembly 150. Not only is the auger 175 engaged a distance into the ground, but engagement of the anchor member 190 with the ground creates resistance against rotational movement. The combination of the auger 175 and anchor member 190 engaged into the ground will resist the application of rotational force to the adjustable camera support assembly 110. Accordingly, a potential thief will not be able to merely rotate the adjustable camera support assembly 110, as the auger 175 and anchor member 190 are inaccessible upon engagement of the locking assembly 200, as they are engaged into the ground and covered by the support plate 135. Further, the potential thief can not merely separate the adjustable camera support assembly 110 from the ground engaging assembly 150, as the two are locked together through engagement of the locking assembly 200 as described above. Finally, the outdoor camera is locked to the adjustable camera support assembly 110.

To remove the adjustable locking camera support assembly 100 from the ground, a user may unlock and remove the outdoor camera from the adjustable camera support assembly 110. The user may also disengage and remove the locking device from the locking mount 185. Once unlocked, the user may grasp the adjustable camera support assembly 110 and apply upward force, disengaging the adjustable camera support assembly 110 from the ground engaging assembly 150. The user may now remove the ground engaging assembly 150. The user would proceed by removing the anchor member 190 from the ground. Once removed, the user may engage the anchor member 190, sloped end 192 first, into the ground engaging assembly aperture 165 (see FIG. 6). The user will then apply rotational force on the anchor member 190 to rotate the auger 175 and disengage the ground engaging assembly 150 from the ground. The ground engaging assembly 150 is now fully withdrawn from the ground and free to be engaged or positioned in a different location.

In one or more examples of embodiments, the user may have a plurality of ground engaging assemblies 150 positioned at a plurality of locations. In this embodiment, the user merely has to unlock and disengage the adjustable camera support assembly 110 from the ground engagement portion 150. The user may then store the adjustable camera support assembly 110 or engage the adjustable camera support assembly 110 with a ground engaging assembly 150 at a different location.

Further, in one or more examples of embodiments, the user may wish to remove and reengage the adjustable camera support assembly 110 with the ground engaging assembly 150 at a later time. Accordingly, the user may disengage the adjustable camera support assembly 110 from the ground engaging assembly 150 and move the adjustable camera support assembly 110 to a storage location for reengagement with the ground engaging assembly 150 at a later time.

There are several advantages to the adjustable locking camera support assembly. The user may freely position the adjustable locking camera support assembly in a variety of locations, terrains or environments. Further, the locking assembly may be freely disengaged, allowing freedom of movement and positioning of the adjustable locking camera support assembly. The adjustable locking camera support assembly provides flexibility in positioning the outdoor camera, as the user may adjust the assembly to different heights, camera angles or rotate the outer support up to 360 degrees to provide a variety of camera angles from a single location. In addition, the adjustable locking camera support assembly is anchored into the ground and then locked to the anchor, providing deterrence against theft. Further, the universal camera mount allows for support and attachment of outdoor cameras of different models, sizes arrangements and attachment devices.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. An adjustable locking camera support assembly comprising:
   a camera support assembly having:
      a first support in telescopic communication with a second support;
      a camera mount pivotally connected to the first support;
      a support plate connected to the second support, the support plate including a first aperture forming a passage to a hollow portion of the second support and a second aperture;
   a ground engaging assembly having:
      a retention plate having a first side opposing a second side, the retention plate carrying an orifice;
      a first member connected to the first side of the retention plate, the first member being removably received by the first aperture and hollow portion of the second support of the camera support assembly;
      a second member connected to the second side of the retention plate, the second member carrying an auger;
      an anchor member removably received by the retention plate orifice and adapted to removably engage a passage carried by the first member;
      a locking mount carried by the retention plate, the locking mount being removably received by the second aperture of the support plate of the camera support assembly.

2. The adjustable locking camera support assembly of claim 1, wherein the locking mount includes an opening there through for receiving a locking device.

3. The adjustable locking camera support assembly of claim 1, wherein the camera mount includes a plurality of slots.

4. The adjustable locking camera support assembly of claim 3, wherein the camera mount includes a plurality of apertures.

5. The adjustable locking camera support assembly of claim 1, further comprising a lock ring attached to the first support.

6. An adjustable locking camera support assembly comprising:
- a support assembly having a first end and a second end;
- a camera support in communication with the support assembly;
- a first plate connected to the second end of the support assembly, the first plate carrying a first aperture through the first plate and into the interior of the support assembly, and a second aperture;
- a ground engaging assembly having a second plate;
- a first member connected to a first side of the second plate, the first member removably received by the first aperture of the first plate and the interior of the support assembly;
- a second member connected to a second side of the second plate, the second member carrying a screw auger;
- a locking mount carried by the second plate and removably received by the second aperture.

7. The adjustable locking camera support assembly of claim 6, wherein the support assembly includes a telescoping support assembly.

8. The adjustable locking camera support assembly of claim 7, wherein the telescoping support assembly includes a first support which telescopically receives a second support.

9. The adjustable locking camera support assembly of claim 8, wherein the first and second supports are hollow.

10. The adjustable locking camera support assembly of claim 9, wherein the interior of the second support removably receives the first member.

11. The adjustable locking camera support assembly of claim 6, wherein the locking mount includes an angled portion connected to the second plate.

12. The adjustable locking camera support assembly of claim 6, wherein the locking mount includes an aperture adapted to receive a locking device.

13. The adjustable locking camera support assembly of claim 6, wherein the camera support is a camera mount.

14. The adjustable locking camera support assembly of claim 13, wherein the camera mount is pivotally connected to the support assembly.

15. The adjustable locking camera support assembly of claim 14, wherein the camera mount includes an aperture and a slot.

16. The adjustable locking camera support assembly of claim 6, further comprising an anchor member, the anchor member is removably received by a third aperture through the second plate.

17. The adjustable locking camera support assembly of claim 16, wherein the first member includes a fourth aperture for removably receiving the anchor member.

18. The adjustable locking camera support assembly of claim 16, wherein the anchor member includes a head portion and a sloped end.

* * * * *